(12) United States Patent
Calomiris

(10) Patent No.: US 11,702,846 B1
(45) Date of Patent: Jul. 18, 2023

(54) TIE-DOWN ANCHOR

(71) Applicant: George Donald Calomiris, Washington, DC (US)

(72) Inventor: George Donald Calomiris, Washington, DC (US)

(*) Notice: Subject to any disclaimer, the term of this patent is extended or adjusted under 35 U.S.C. 154(b) by 0 days.

(21) Appl. No.: 17/649,644

(22) Filed: Feb. 1, 2022

(51) Int. Cl.
E04F 15/02 (2006.01)
B63B 21/04 (2006.01)
F16B 21/02 (2006.01)

(52) U.S. Cl.
CPC .............. *E04F 15/02* (2013.01); *B63B 21/04* (2013.01); *F16B 21/02* (2013.01)

(58) Field of Classification Search
CPC ........... F16B 21/02; B63B 21/04; E04F 15/02
See application file for complete search history.

(56) References Cited

U.S. PATENT DOCUMENTS

| 1,435,887 | A |   | 11/1922 | Anderson |             |
|-----------|---|---|---------|----------|-------------|
| 3,703,875 | A | * | 11/1972 | Gunvalson | B63B 21/04 |
|           |   |   |         |          | 294/93      |
| 4,297,963 | A |   | 11/1981 | Beacom   |             |
| 4,899,680 | A | * | 2/1990  | Russell, Jr. | B63B 21/24 |
|           |   |   |         |          | 294/82.11   |
| D321,470  | S |   | 11/1991 | Gerrard  |             |
| 5,967,075 | A | * | 10/1999 | Johansen | A47B 23/02  |
|           |   |   |         |          | 114/230.1   |
| 6,793,189 | B1|   | 9/2004  | McKay    |             |
| D530,188  | S |   | 10/2006 | Kalat    |             |
| 7,156,357 | B1|   | 1/2007  | Kocur    |             |
| D801,150  | S |   | 10/2017 | Welch    |             |
| 10,598,202| B2|   | 3/2020  | Welch    |             |
| 2005/0246997 | A1 | | 11/2005 | Bishop |             |
| 2007/0292229 | A1 | | 12/2007 | Andrew et al. |       |
| 2011/0079700 | A1 | | 4/2011  | Hilderbrand |         |

* cited by examiner

*Primary Examiner* — Andrew J Triggs
(74) *Attorney, Agent, or Firm* — Welsh Flaxman & Gitler, LLC

(57) ABSTRACT

A tie-down anchor for use with decking boards, or the like, having a gap with a longitudinal axis located between adjacent decking boards. The tie-down anchor includes a continuously formed anchor having a lower leg extending in a first direction in a first horizontal plane, a vertical section connected to the lower leg and perpendicular to the first horizontal plane, an upper leg that is parallel to the lower leg and lies in a second horizontal plane spaced above the first horizontal plane by the length of vertical section, and a loop above the vertical section and the upper leg. Wherein the lower leg can be inserted within the gap between adjacent decking boards and the loop turned to trap the anchor between the decking boards such that the upper leg and lower leg are perpendicular to the longitudinal axis of the gap.

20 Claims, 6 Drawing Sheets

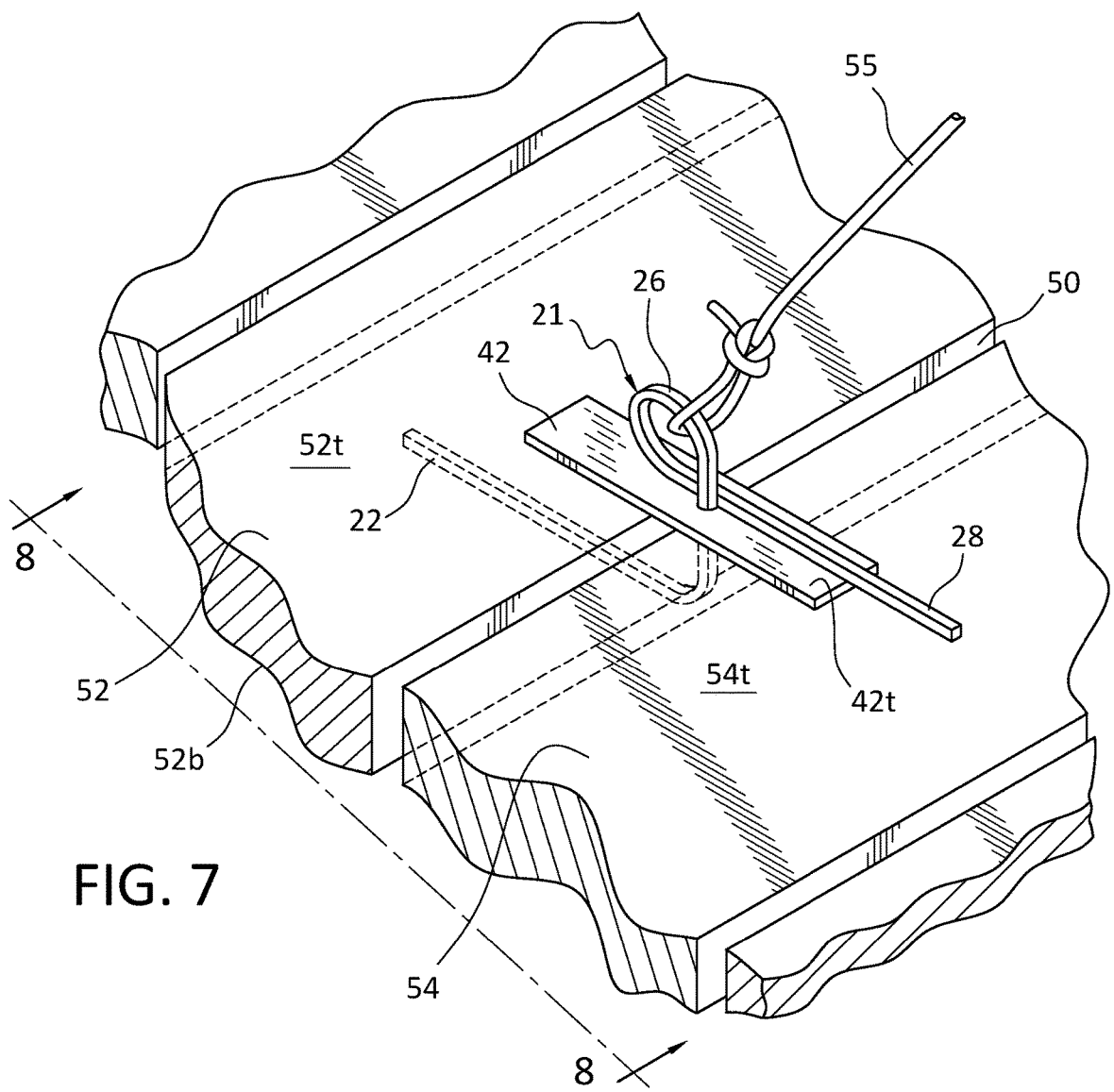
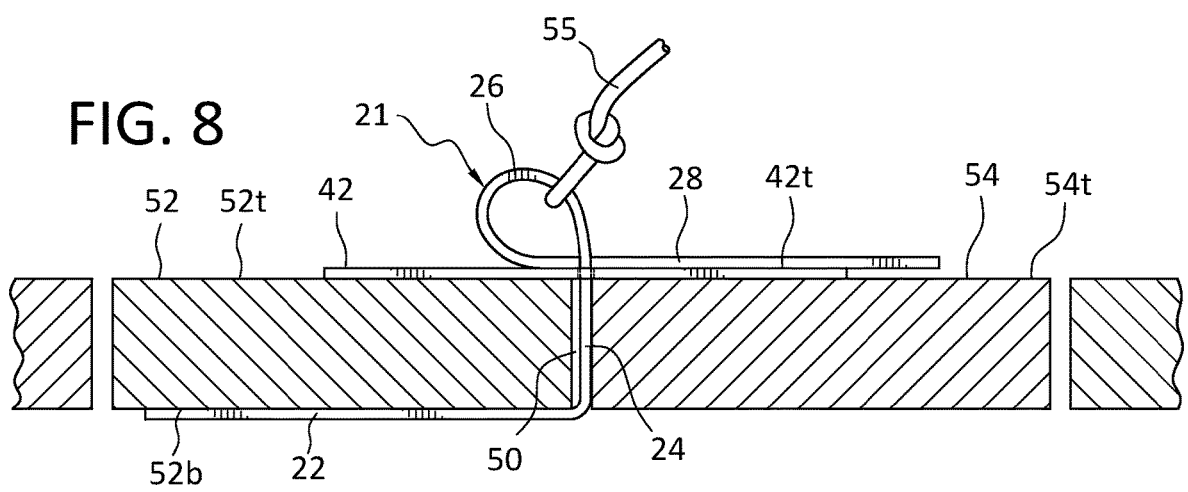

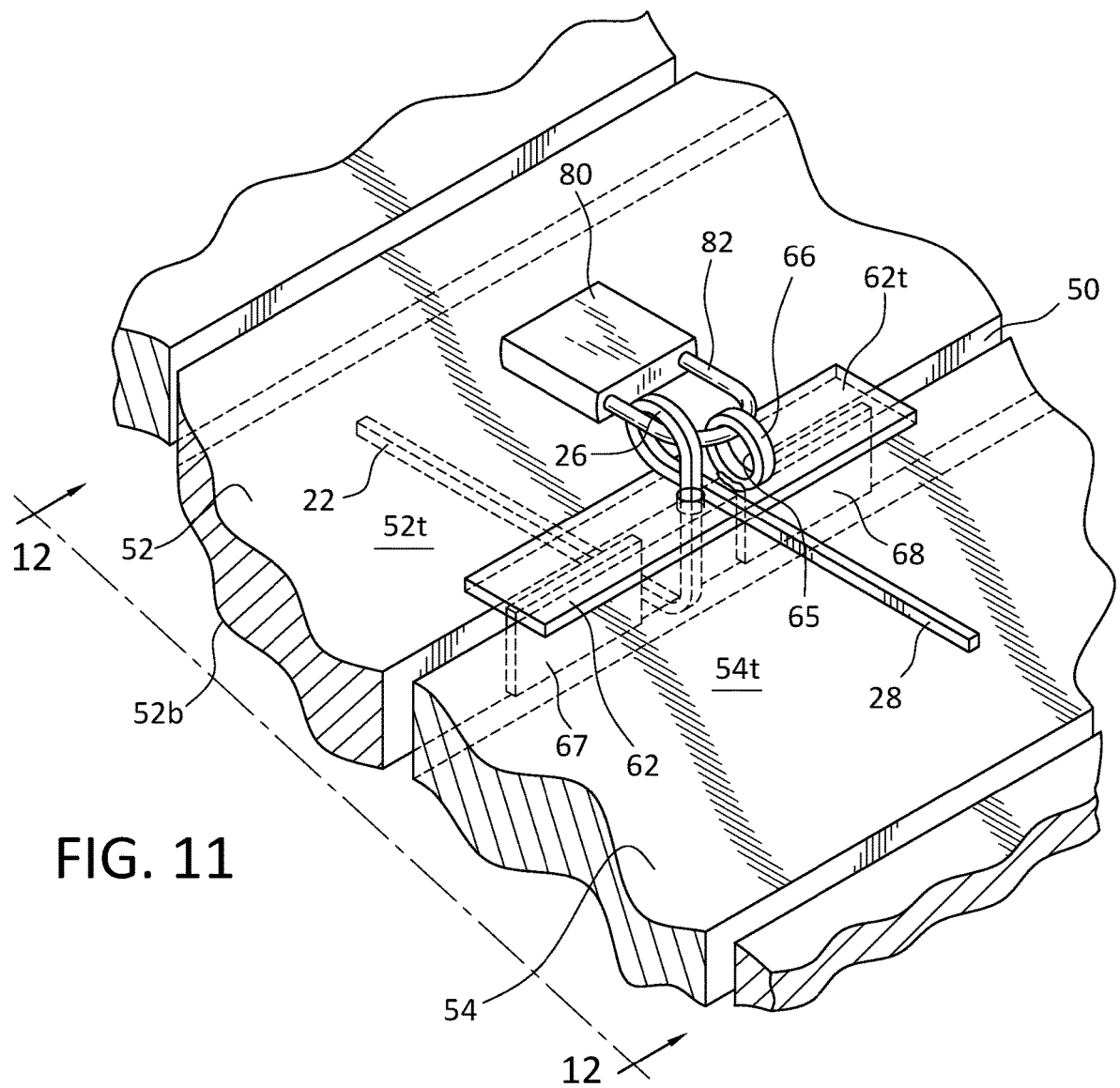
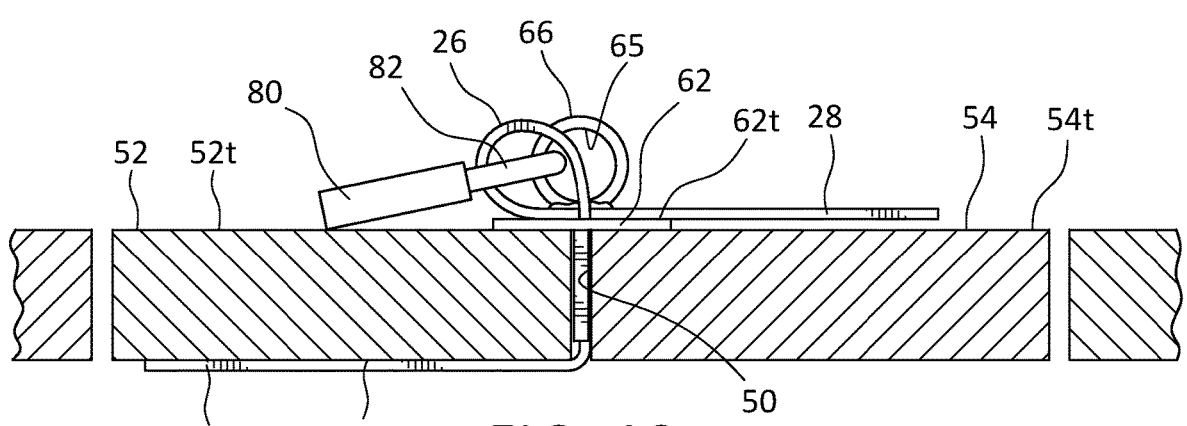

TIE-DOWN ANCHOR

BACKGROUND OF THE INVENTION

1. Field of the Invention

This invention relates to tie-down anchors for use with decking boards, or the like, which are reusable. More particularly, the invention relates to reusable tie-down anchors used to fasten objects to decks or the like, wherein the reusable tie-down anchors use the gap between adjacent decking boards to secure the reusable tie-down anchors to the decks or the like.

2. Description of the Related Art

There have been numerous attempts to create deck tie-down devices which use the gap between deck boards to pinch a board and maintain the deck tie down device in position relative to the boards. For example, U.S. Pat. No. 4,297,963 to Beacom shows a mooring device which is inserted in the space between adjacent planks on a dock and includes a biasing means associated with the shaft and plate to hold a ring in position. A device similar to Beacom is shown in U.S. Pat. No. 10,598,202 to Welch. Additionally, a deck tie-down of interest is shown in U.S. Patent Application Publication No. 2007/0292229 to Andrew et al.

SUMMARY OF THE INVENTION

It is, therefore, an object of the present invention to provide a tie-down anchor for use with decking boards having an upper surface and a lower surface and a gap with a longitudinal axis located between adjacent decking boards. The tie-down anchor includes a continuously formed anchor. The continuously formed anchor includes a lower leg with a free first end which extends a length of less than six inches in a first direction in a first horizontal plane and connected to a vertical section. The vertical section has a length that starts at the first end of the vertical section and continues vertically upward to a second end. The vertical section is perpendicular to the first horizontal plane and the second end of the vertical section is connected to a loop. The loop includes a first end that is connected to the second end of the vertical section and a second end which is connected to an upper leg. The upper leg is parallel to the lower leg and lies in a second horizontal plane spaced above the first horizontal plane by the length of the vertical section. The upper leg extends from a first end to a free second end. In use, the lower leg can be inserted within the gap between adjacent decking boards and the loop turned to trap the anchor between the decking boards such that the upper leg and the lower leg are perpendicular to the longitudinal axis of the gap.

It is another object to provide a tie-down anchor wherein the continuously formed anchor is integrally formed from a single rod.

It is another object to provide a tie-down anchor wherein the rod has a square cross section.

It is another object to provide a tie-down anchor wherein the rod has a width of ⅛ inch and thickness of ⅛ inch.

It is another object to provide a tie-down anchor wherein the continuously formed anchor is integrally formed in a mold.

It is another object to provide a tie-down anchor wherein the length of the vertical section is between 1 to 1.5 inches.

It is another object to provide a tie-down anchor wherein the loop defines a 360-degree turn with an opening.

It is another object to provide a tie-down anchor wherein the upper leg is shorter than the lower leg.

It is another object to provide a tie-down anchor wherein the loop includes an opening which is located above the upper leg.

It is another object to provide a tie-down anchor including a metal plate with a hole which cooperates with the lower leg when passed through the hole.

It is another object to provide a tie-down anchor wherein the metal plate is rectangular and has short edges, long edges, an upper surface, and a lower surface.

It is another object to provide a tie-down anchor wherein the metal plate has a thickness of ⅛ inch.

It is another object to provide a tie-down anchor wherein the metal plate includes an upper surface and a lower surface, and the hole extends therethrough. The lower leg cooperates with the hole when passed therethrough. In use, the lower leg is passed through the hole and inserted within the gap between adjacent decking boards with the metal plate above the upper surface of adjacent decking boards and the loop is turned to trap the anchor between the decking boards such that the upper leg and the lower leg are perpendicular to the longitudinal axis of the gap and the metal plate can be rotated so as to be perpendicular to the longitudinal axis of the gap to trap the metal plate upon the upper surface of adjacent decking boards.

It is another object to provide a tie-down anchor wherein the hole runs from the upper surface to the lower surface and is dimensioned to permit the lower leg to pass through the hole. The metal plate further includes a ring extending from the upper surface of the metal plate and fins extending transversely from the lower surface of the metal plate on opposite sides of the hole.

It is another object to provide a tie-down anchor wherein the ring runs perpendicular to the long edges of the metal plate and is adjacent the hole, such that when the lower leg of the anchor is inserted through the hole and turned an opening in the loop and an opening in the ring are aligned to permit an arm of a pad lock to pass through the opening in the loop and the opening in the ring.

It is another object to provide a tie-down anchor wherein the ring is made from a metal.

It is another object to provide a tie-down anchor wherein the ring extends from the upper surface of the metal plate in a first vertical plane and the fins extend transversely from the lower surface of the metal plate in a single vertical plane perpendicular to the first vertical plane of the ring.

It is another object to provide a tie-down anchor wherein the hole and fins are located within the single vertical plane.

It is another object to provide a tie-down anchor wherein the ring extends from the upper surface of the metal plate perpendicular to the long edges of the metal plate and the fins extend parallel to the long edges of the metal plate.

It is another object to provide a tie-down anchor wherein the metal plate includes an upper surface and a lower surface, and the hole extends therethrough. The metal plate further includes a ring extending from the upper surface of the metal plate and fins extending transversely from the lower surface of the metal plate on opposite sides of the hole. The lower leg cooperates with the hole when passed therethrough. In use, the lower leg is passed through the hole and inserted within the gap between adjacent decking boards with the metal plate above the upper surface of adjacent decking boards and the loop is turned to trap the anchor between the decking boards such that the upper leg and the lower leg are perpendicular to the longitudinal axis of the gap and the metal plate fixed within the gap by the fins such that the metal plate is trapped upon the upper surface of adjacent decking boards.

Other objects and advantages of the present invention will become apparent from the following detailed description when viewed in conjunction with the accompanying drawings, which set forth certain embodiments of the invention.

BRIEF DESCRIPTION OF THE DRAWINGS

FIG. 7 is a perspective view of the second embodiment of the tie-down anchor being inserted within the gap between adjacent decking boards and turned 90 degrees so as to be perpendicular to the longitudinal axis of the gap between adjacent decking boards and secured thereto.

FIG. 8 is a sectional view of the second embodiment of a taken along line 8-8 in FIG. 7.

FIG. 11 is a perspective view of the third embodiment of the two-piece tie-down anchor being inserted within the gap between adjacent decking boards with one of the pieces turned 90 degrees so as to be perpendicular to the longitudinal axis of the gap between adjacent decking boards and locked thereto.

FIG. 12 is a sectional view of the third embodiment of the two-piece tie-down anchor taken along line 12-12 in FIG. 11.

DESCRIPTION OF THE PREFERRED EMBODIMENTS

The detailed embodiments of the present invention are disclosed herein. It should be understood, however, that the disclosed embodiments are merely exemplary of the invention, which may be embodied in various forms. Therefore, the details disclosed herein are not to be interpreted as limiting, but merely as a basis for teaching one skilled in the art how to make and/or use the invention.

Referring to the various FIGS. 1 to 12, three embodiments of the present invention are shown. With reference to FIGS. 1 to 4 a one-piece continuously formed tie-down anchor 20, which is reusable, will be described. With reference to FIGS. 5 to 8 a two-piece tie-down anchor 40, which is reusable, will be described. With reference to FIGS. 9 to 12 a two-piece tie-down anchor 60, which is reusable and lockable, will be described. The following disclosure uses terms such as horizontal and vertical to describe various elements of the tie-down anchor. It is appreciated the terms horizontal and vertical are relative terms and vary depending upon the position of the tie-down anchor within space. As used herein the terms describe the tie-down anchor as it is positioned for use with the horizontally oriented boards of an installed deck.

Figure 1:
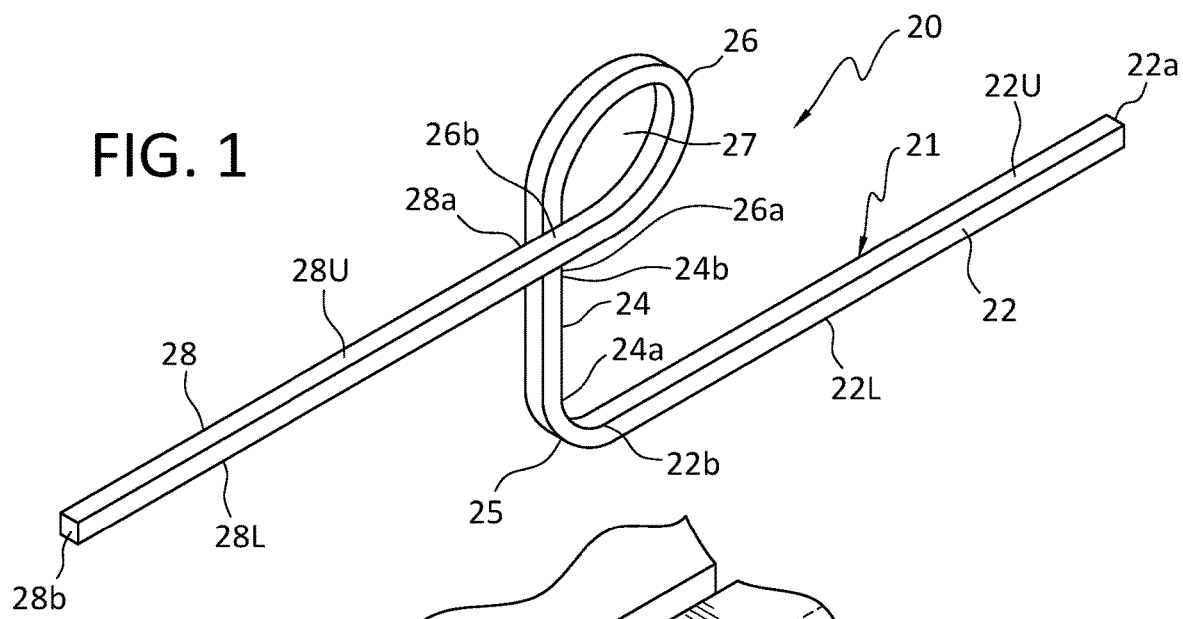
FIG. 1 is a perspective view of a first embodiment of a tie-down anchor of the present invention formed as one piece.

As shown in FIG. 1 the one-piece tie-down anchor 20 is formed from a single piece of elongated and continuous metal rod 21 having a square cross section. The metal rod 21 is bent such that the resulting tie-down anchor 20 includes a lower leg 22 lying in a first horizontal plane. The lower leg 22 includes an upper surface 22U, a lower surface 22L, a free first end 22a, and a second end 22b. The metal rod 21 is bent adjacent the second end 22b of the lower leg 22 to define a vertical section 24 that transitions from the lower leg 22. In particular, a first end 24a of the vertical section 24 is connected to the second end 22b of the lower leg 22 at the bend 25. The vertical section 24 is perpendicular to the first horizontal plane and starts at the first end 24a of the vertical section 24 and continues vertically up to a second end 24b of the vertical section. The vertical section 24 at the second end 24b transitions into a loop 26 which in turn transitions into an upper leg 28.

The loop 26 includes a first end 26a that is connected to, and contiguous with, the second end 24b of the vertical section 24. The loop 26 defines a 360-degree turn that transitions the vertical section 24 of the tie-down anchor 20 into the upper leg 28 of the tie-down anchor 20. The loop 26 also includes a second end 26b that is connected to, and contiguous with, the first end 28a of the upper leg 28. The loop 26 substantially lies in a vertical plane that is perpendicular to the horizontal plane in which the lower leg 22 lies. The term "substantially" is used herein because it is acknowledged that the first end 26a and second end 26b of the loop are slightly offset to allow for the positioning of the loop 26 between the lower leg 22 and the upper leg 28.

The upper leg 28 is parallel to the lower leg 22 and lies in a second horizontal plane spaced above the first horizontal plane by the length of vertical section 24. The upper leg 28 extends from the first end 28a, adjacent the second end 26b of the loop 26, to a free second end 28b and includes an upper surface 28U and a lower surface 28L.

Accordingly, from the bend 25 connecting the vertical section 24 to the lower leg 22, the lower leg 22 extends in a first direction to its a free first end 22a. From the second end 26b of the loop 26 where the upper leg 28 is connected thereto, the upper leg 28 extends in a second direction (which is opposite to the first direction in which the lower leg 22 extends) to its free second end 28b. The loop 26 starts at the second end 24b of the vertical section 24 and curves around to form an opening 27 which is above the upper leg 28 and then ends at the first end 28a of the upper leg 28. The vertical section 24 is formed below the lower surface 28L of the upper leg 28. The vertical section 24 is between the first horizontal plane in which the lower leg 22 resides and the second horizontal plane in which upper leg 28 resides.

In accordance with a disclosed embodiment, the metal rod 21 is preferably a stock ⅛ inch by ⅛ inch by 12-inch rod made from a steel alloy; that is the rod has a width of ⅛ inch, a thickness of ⅛ inch and a length of 12 inches, such as key stock. However, it can be made from various metals depending upon the environment in which the tie-down anchor 20 is going to be used.

In accordance with a disclosed embodiment, the lower leg 22 is longer than the upper leg 28 and is less than 6 inches in length, preferably between 5 to 5.5 inches in length. The upper leg is between 3 to 4.5 inches in length. The vertical section 24 can range in length depending upon the thickness of the decking boards or the like. Generally decking boards are 5/4 inches thick by 6 inches wide, but often 2×6 boards are used. Accordingly, the length of the vertical section 24 ranges between 1 to 1.5 inches as the width of a 2×6 board is generally 1.5 inches.

Figure 2:
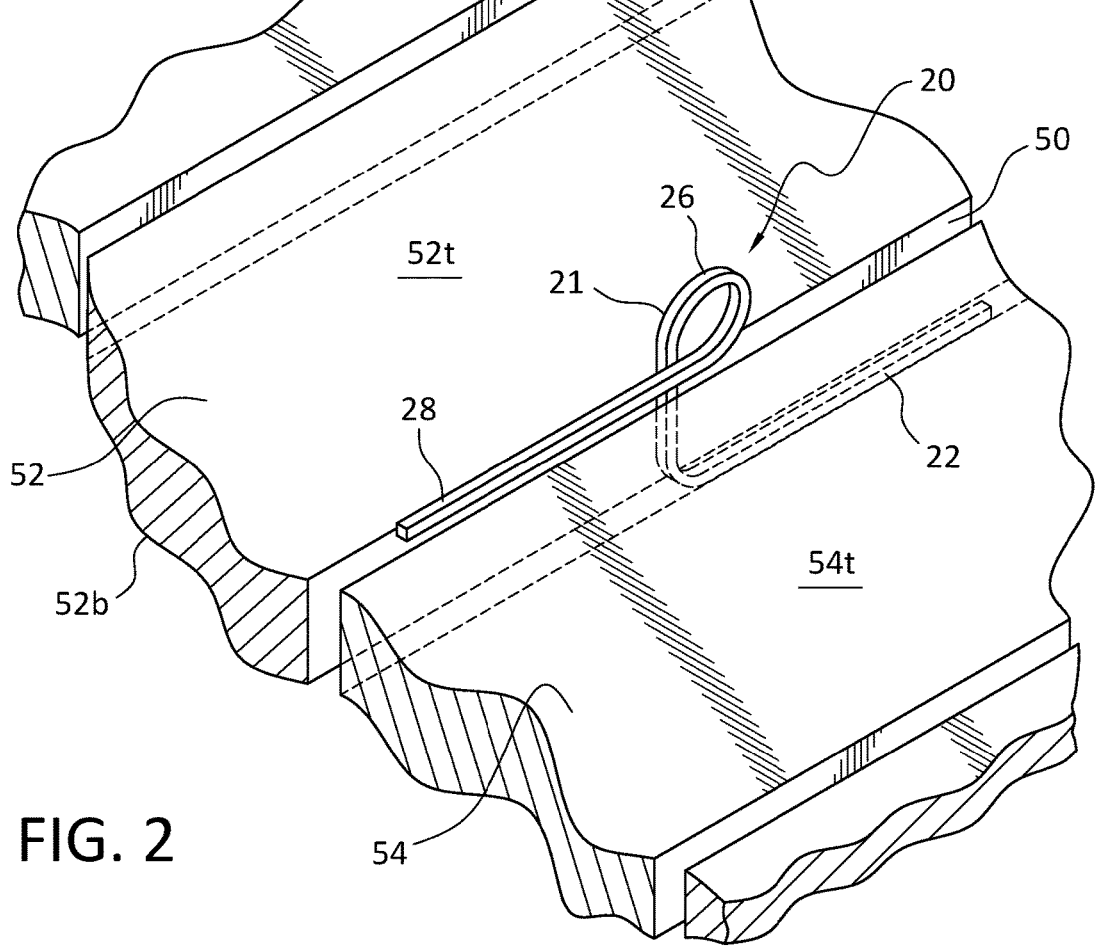
FIG. 2 is a perspective view of the first embodiment of a tie-down anchor being inserted within the gap between adjacent decking boards and parallel thereto.
Figure 3:
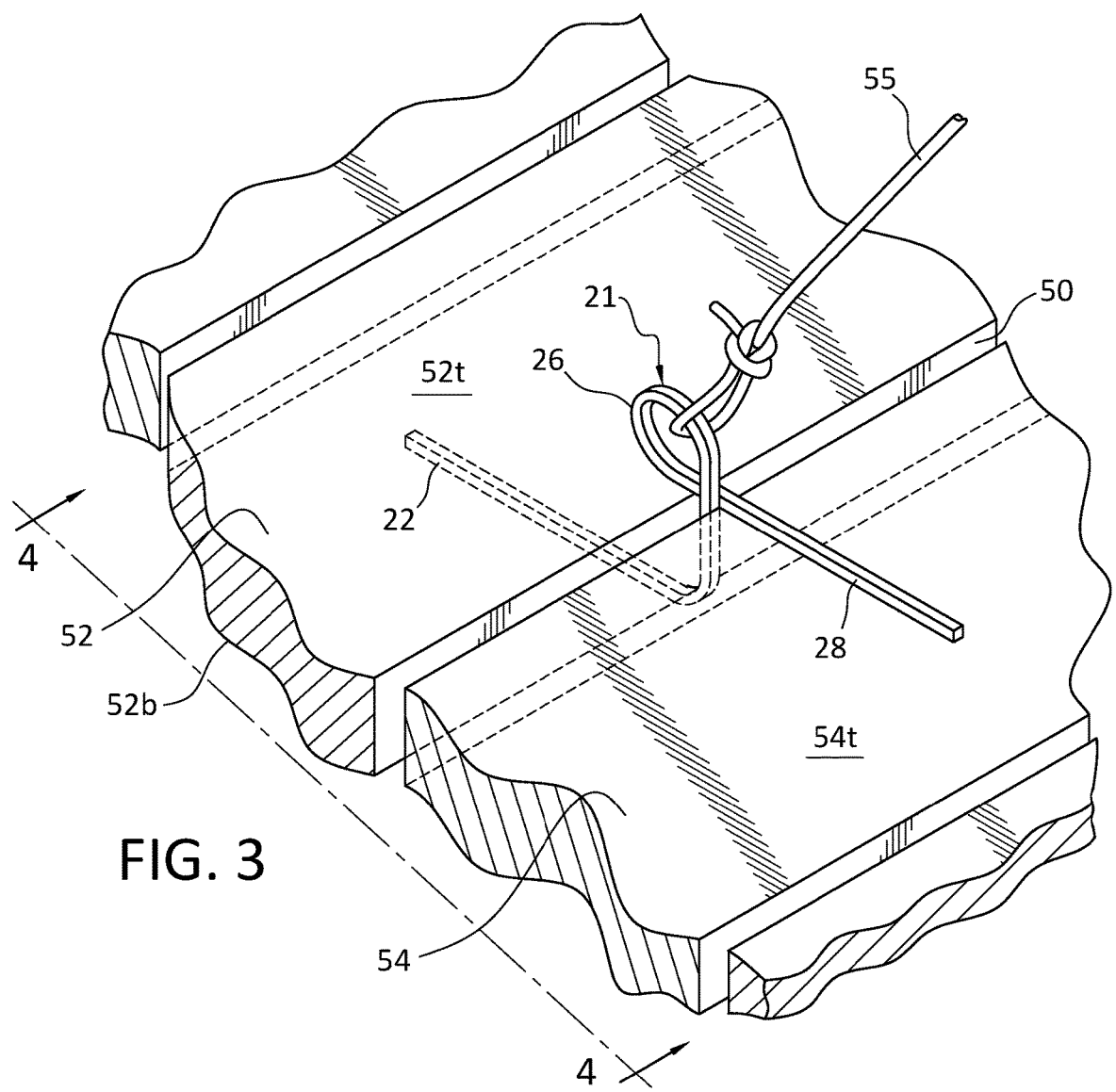
FIG. 3 is a perspective view of the first embodiment of a tie-down anchor being inserted within the gap between adjacent decking boards and turned 90 degrees so as to be perpendicular to the longitudinal axis of the gap between adjacent decking boards and secured thereto.
Figure 4:
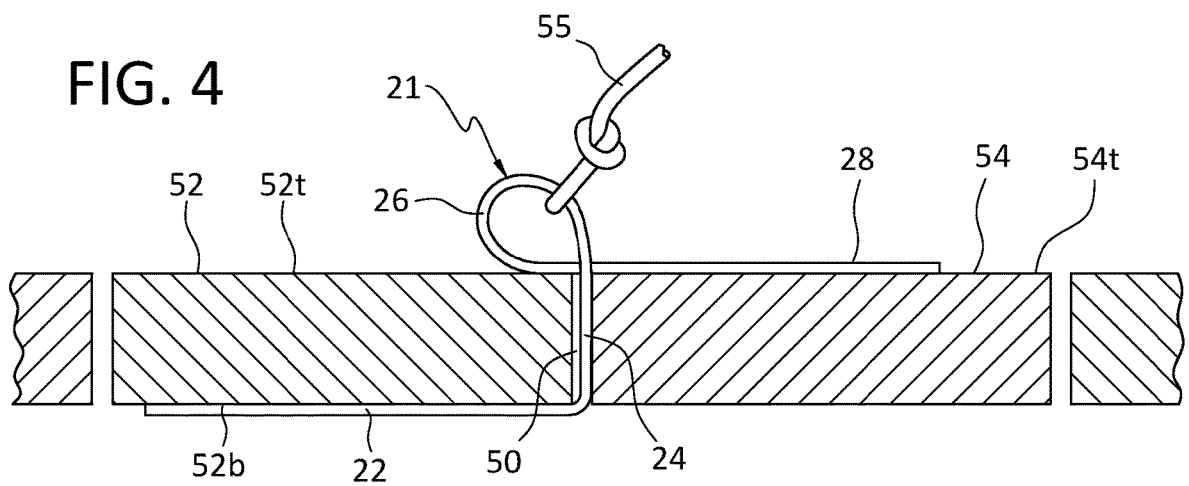
FIG. 4 is a sectional view of the first embodiment of a tie-down anchor taken along line 4-4 in FIG. 3.
Figure 5:
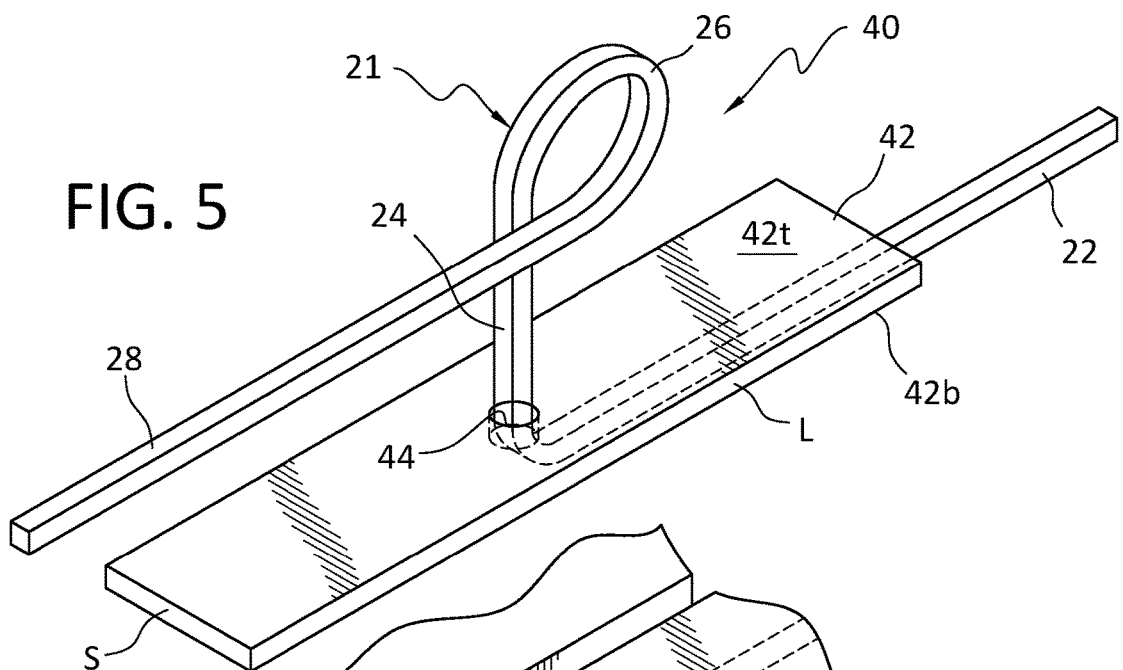
FIG. 5 is a perspective view of a second embodiment of a tie-down anchor of the present invention formed from two cooperating pieces.

In use, and with reference to FIGS. 2, 3, and 4, the lower leg 22 is slipped between a gap 50 formed between adjacent decking boards 52, 54 after the deck, or the like, is constructed. Once the one-piece tie-down anchor 20 is inserted in the gap 50 and the upper surface 22U of lower leg 22 is below the bottom surface of decking board 52, the loop 26 is turned a quarter turn (approximately 90 degrees) such that the upper leg 28 and lower leg 22 are perpendicular to the longitudinal axis of the gap 50. In this position, the tie-down anchor 20 is trapped between adjacent decking boards 52, 54 such that the upper leg 28 resides on upper surface 54t of a decking board 54 and lower leg 22 resides underneath decking board 52. As best seen in FIG. 4, once the tie-down anchor 20 is in this perpendicular orientation a rope 55, or the like, can be attached to the loop 26 such that when tension is applied to the rope 55 the tie-down anchor 20 will function to apply a force to the upper (or top) surface 54t of decking board 54 via upper leg 28 and to apply a force to the lower (or bottom) surface 52b of decking board 52 via lower leg 22. In use it is desirable to have the rope 55 pull straight up or in the direction of upper leg 28. As depending upon the direction of force applied to the loop 26, the forces could cause the upper leg 28 and the lower leg 22 to rotate either clockwise or counterclockwise. As shown, the desired rotation is clockwise as the force on the loop 26 is being applied from the direction of the upper leg 28. If the tie-down anchor 20 is reversed with the upper leg 28 above decking board 52 and lower leg 22 under decking board 54 then the desired rotation would be counterclockwise as once again it desired to have the force be applied in the direction of the upper leg 28.

Turning to FIGS. 5 to 8, the second embodiment of the tie-down anchor 40 is shown. In this embodiment two separate pieces, that is, a tie-down anchor 20 and a metal plate 42, are formed which cooperate with each other during use. This embodiment uses the same tie-down anchor 20 constructed from an elongated and continuous metal rod 21 having a square cross section as described above with regard to the first embodiment and a metal plate 42. The metal plate 42 is preferably rectangular in shape and has long edges L and short edges S, although other shapes are contemplated and could be used as long as the width is greater than the width of the gap 50. Since the metal rod 21 is identical to that described above no further description will be provided.

The dimensions of the metal plate 42 in accordance with a disclosed embodiment are as follows: thickness between 1/8 inch to 1/4 inch, long edge L between 5 inches to 6 inches, and short edge S between 1 inch to 2 inches wide. While these dimensions are preferred, they could be varied without departing from the scope of the invention.

Figure 6:
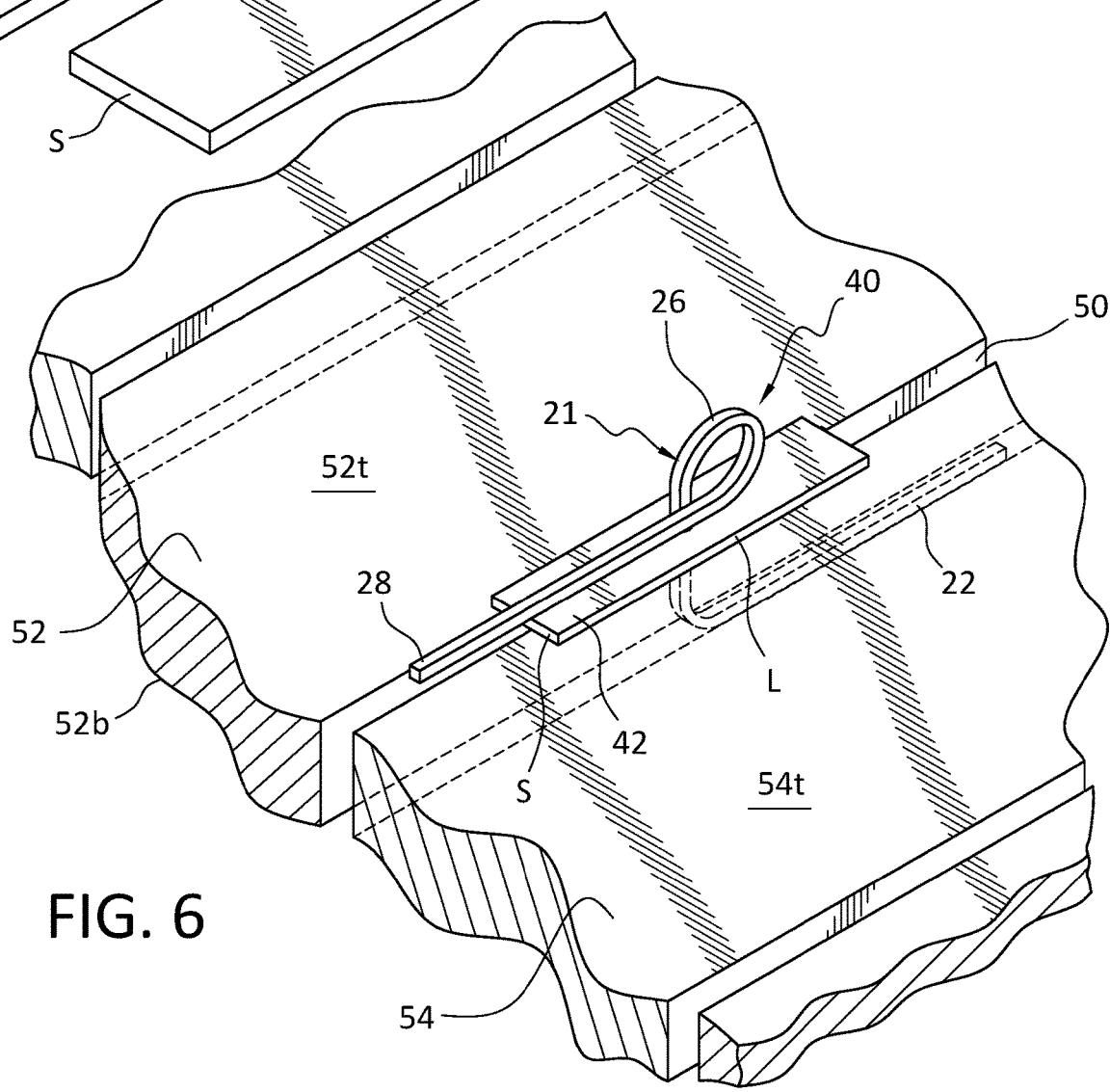
FIG. 6 is a perspective view of the second embodiment of the tie-down anchor being inserted within the gap between adjacent decking boards and parallel thereto.
Figure 9:
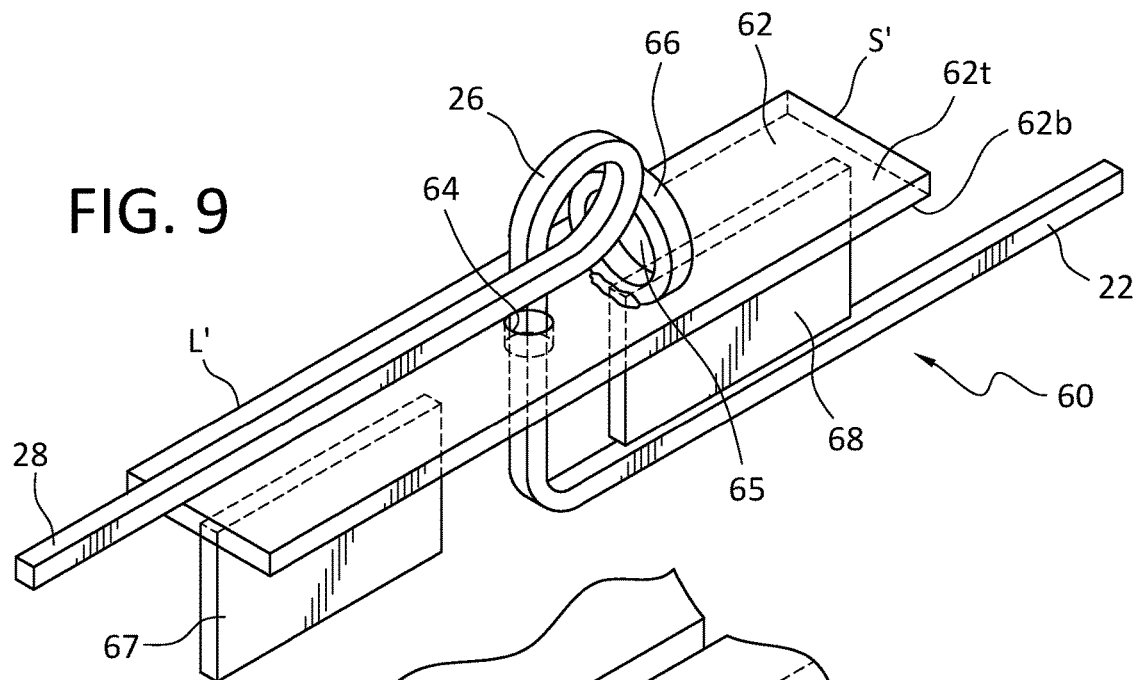
FIG. 9 is a perspective view of a third embodiment of a two-piece tie-down anchor which can be locked to the decking boards.

The metal plate 42 includes an upper (or top) surface 42t and a lower (or bottom) surface 42b. The metal plate 42 also includes a hole 44 which runs from the upper surface 42t to the lower surface 42b and is dimensioned to permit the lower leg 22 to pass through hole 44. As seen in FIG. 6, the lower leg 22 passes through the hole 44 and then the metal plate 42 travels up the vertical section 24 and into contact with upper leg 28.

In use, the lower leg 22 is slipped between the gap 50 between the adjacent decking boards 52, 54 with the metal plate 42 remaining on top of the decking boards 52, 54 as shown in FIG. 6. While the metal plate 42 is shown to have its long edges L running along the longitudinal axis of the gap 50 during insertion of the lower leg 22 through the gap 50, the long edges L could be in any orientation as long as metal plate 42 remains above the decking boards 52, 54. In this embodiment both the loop 26 and metal plate 42 are turned as shown in FIG. 7 such that the upper leg 28, lower leg 22, and long edges L of the metal plate 42 are all perpendicular to the longitudinal axis of the gap 50. In this position, the tie-down anchor 40 is trapped between adjacent decking boards 52, 54 such that the upper leg 28 resides on the upper surface 42t of the metal plate 42 and the lower leg 22 resides underneath the decking board 52 and the metal plate 42 is trapped across adjacent decking boards 52, 54.

As best seen in FIG. 8, once the tie-down anchor 40 is in this perpendicular position a rope 55, or the like, can be attached to the loop 26 such that when tension is applied to the rope 55 the tie-down anchor 40 will function to apply a force to the upper surface 54t of the decking board 54 via the upper leg 28 pushing down on the upper surface 42t of the metal plate 42 and in turn onto the upper surface 54t. The tie-down anchor 40 will also function to apply a force to the lower surface 52b of decking board 52 via lower leg 22. It is important the tension provided by the rope 55 closely aligns with the vertical and longitudinal axes of the vertical section 24. Accordingly, in use, it is desirable to have the rope 55 pull straight up or in the direction of the upper leg 28. As depending upon the direction of force applied to the loop 26 the forces may cause the upper leg 28 and the lower leg 22 to rotate either clockwise or counterclockwise. As shown, the desired rotation is clockwise as the force on the loop 26 is being applied from the direction of the upper leg 28. If the tie-down anchor 20 is reversed with the upper leg 28 above decking board 52 and lower leg 22 under decking board 54 then the desired rotation would be counterclockwise as once again it desired to have the force be applied in the direction of the upper leg 28.

Turning to FIGS. 9 to 12, the third embodiment of a tie-down anchor 60 is shown. In this embodiment tie-down anchor 60 can be locked to a deck. The third embodiment is similar to the second embodiment and includes two separate pieces which cooperate with each other during use. This embodiment uses the same tie-down anchor 20 constructed from an elongated and continuous metal rod 21 having a square cross section as described above with regard to the first embodiment and a metal plate 62. Since the tie-down anchor 20 constructed from a metal rod 21 is identical to that described above no further description will be provided.

The dimensions of the metal plate 62 in accordance with a disclosed embodiment are as follows: thickness between 1/8 inch to 1/4 inch, long edges L' between 5 inches to 6 inches, and short edges S' between 1 inch to 2 inches wide. While these dimensions are preferred, they could be varied without departing from the scope of the invention.

The metal plate 62 includes an upper (or top) surface 62t and a lower (or bottom) surface 62b. The metal plate 62 also includes a hole 64 which runs from the upper surface 62t to the lower surface 62b and is dimensioned to permit the lower leg 22 to pass through the hole 64.

Figure 10:
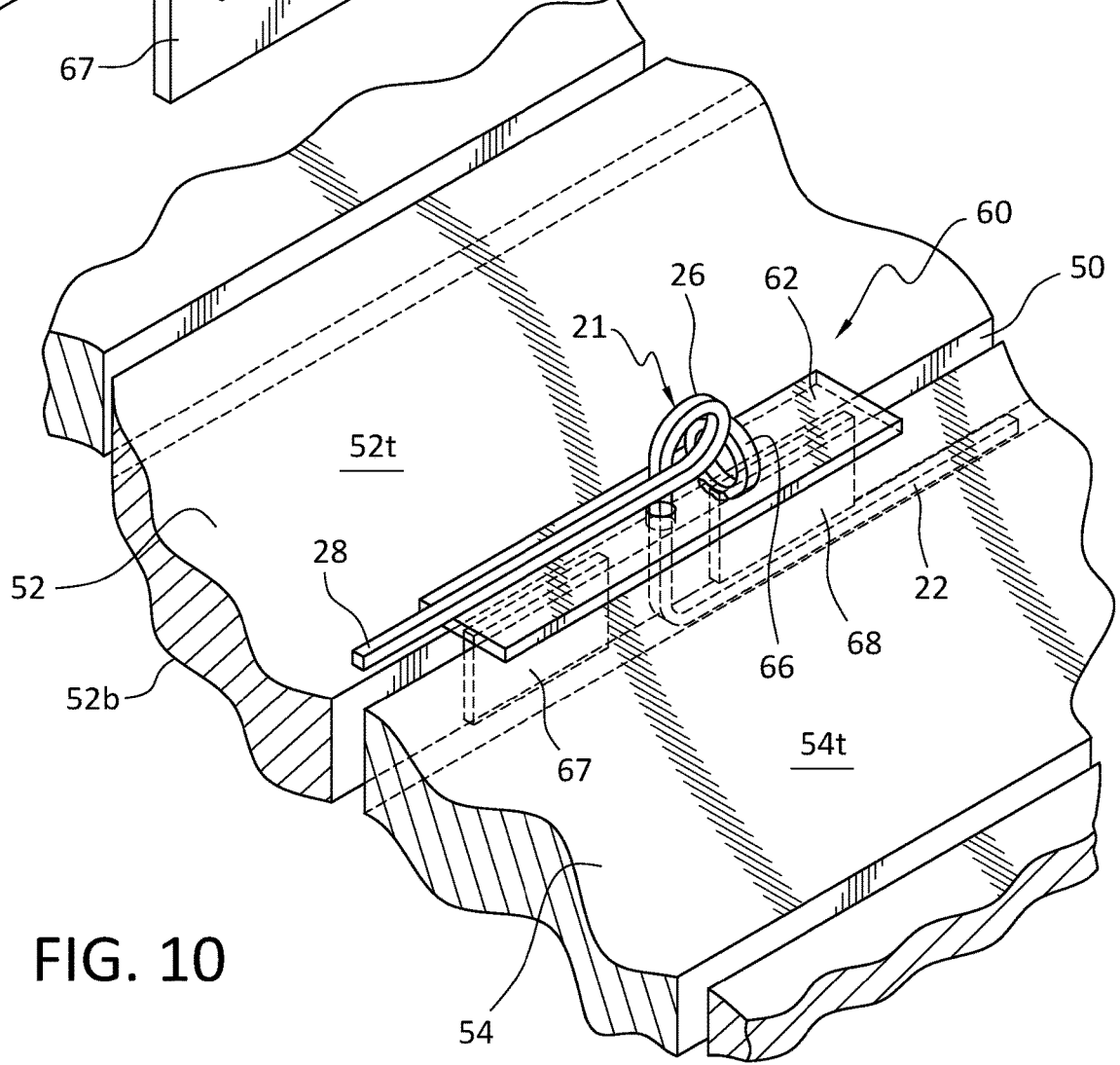
FIG. 10 is a perspective view of the third embodiment of the two-piece tie-down anchor being inserted within the gap between adjacent decking boards and parallel thereto.

Extending from the upper surface 62t is a metal ring 66 which is welded thereto and has an opening 65. The ring 66 is perpendicular to the long edges L' of the metal plate 62 and is adjacent the hole 64. Extending from the lower surface 62b are spaced fins 67 and 68. The fins 67, 68 are on opposite sides of the hole 64 and extend transversely from the lower surface 62b in a single vertical plane. The fins 67, 68 run along the center longitudinal axis of metal plate 62. Accordingly, the metal ring 66 extends from the upper surface 62t of the metal plate 62 in a first vertical plane and the fins 67, 68 extend transversely from the lower surface 62b of the metal plate 62 in a single vertical plane perpendicular to the first vertical plane of the metal ring 66. In accordance with a disclosed embodiment, the fins 67, 68 are approximately ⅛ inch thick and approximately 1 inch in length. The width of the fins 67, 68 or the dimension which extends transversely from lower surface 62b is less than the length of vertical section 24 in order to allow the lower leg 22 of the tie-down anchor 60 to turn after passing through the gap 50. As seen in FIG. 10, the lower leg 22 passes through the hole 64 and then the metal plate 62 travels up the vertical section 24 and into contact with upper leg 28.

In use, the lower leg 22 and the fins 67, 68 are slipped within the gap 50 between the adjacent decking boards 52, 54 with the metal plate 62 remaining on top of the decking boards 52, 54 as shown in FIG. 10. The metal plate 62 has its long edges L' running along the longitudinal axis of the gap 50 during insertion and use. Unlike with the second embodiment of the tie-down anchor 40, the metal plate 62 does not rotate once placed in the gap 50 as the fins 67, 68 prevent rotation. The loop 26, upper leg 28, and lower leg 22 are rotated as shown in FIG. 11 to orientate the loop 26 adjacent to and parallel to the metal ring 66. In this position, the tie-down anchor 60 is trapped between adjacent decking boards 52, 54 such that the upper leg 28 contacts the upper surface 62t of the metal plate 62 and the lower leg 22 resides underneath the decking board 52. Once the metal rod 21 is perpendicular to the longitudinal axis of the gap 50 and the loop 26 and the ring 66 are aligned, an arm 82 of pad lock 80 can be inserted through the opening 27 in loop 26 and the opening 65 in the ring 66 and locked. Once the pad lock 80 is locked, the tie-down anchor 60 will not be able to be removed from the decking boards 52, 54 until the pad lock 80 is unlocked and the metal rod 21 is rotated to align with the gap 50.

A rope (not shown) can be attached to the loop 26, the ring 66, or the pad lock 80 and the tie-down anchor 60 will function similar to the second embodiment of the tie-down anchor 40. That is, when tension is applied to the rope the tie-down anchor 60 will function to apply a force to the upper surface 62t of the metal plate 62 and in turn onto the upper surface 54t of the decking board 54 and the upper surface of 52t of decking board 52 via the upper leg 28 pushing down. The tie-down anchor 60 will also function to apply a force to the lower surface 52b of decking board 52 via the lower leg 22. It is important the tension provided by the rope 55 closely aligns with the vertical and longitudinal axes of vertical section 24. Accordingly, in use, it is desirable to have the rope 55 pull straight up or in the direction of upper leg 28. As depending upon the direction of force applied to the loop 26 the forces may cause the upper leg 28 and the lower leg 22 to rotate either clockwise or counter-clockwise. As shown, the desired rotation is clockwise as the force on the loop 26, ring 66, or pad lock 80 is being applied from the direction of the upper leg 28. If the tie-down anchor 20 is reversed with the upper leg 28 above decking board 52 and lower leg 22 under decking board 54 then the desired rotation would be counterclockwise as once again it desired to have the force be applied in the direction of the upper leg 28.

While the preferred embodiments have all been described using a bent rod, it should be fully appreciated that a reusable tie-down anchor having parallel upper and lower legs spaced from each other in horizontal planes by a vertical section which transitions into a loop above the upper leg could be formed via a mold and the result would be an integrally formed anchor.

While the preferred embodiments have been shown and described, it will be understood that there is no intent to limit the invention by such disclosure, but rather, is intended to cover all modifications and alternate constructions falling within the spirit and scope of the invention.

The invention claimed is:

1. A tie-down anchor for use with decking boards having an upper surface and a lower surface and a gap with a longitudinal axis located between adjacent decking boards, the tie-down anchor comprising:
   a continuously formed anchor including:
      a lower leg with a free first end which extends a length of less than six inches in a first direction in a first horizontal plane and connected to a vertical section;
      the vertical section having a length that starts at a first end of the vertical section and continues vertically upward to a second end, the vertical section being perpendicular to the first horizontal plane and the second end of the vertical section is connected to a loop;
      the loop including a first end that is connected to the second end of the vertical section and a second end which is connected to an upper leg;
      the upper leg is parallel to the lower leg and lies in a second horizontal plane spaced above the first horizontal plane by the length of the vertical section, the upper leg extends from a first end to a free second end; and
      wherein the lower leg can be inserted within the gap between adjacent decking boards and the loop turned to trap the anchor between the decking boards such that the upper leg and the lower leg are perpendicular to the longitudinal axis of the gap.

2. The tie-down anchor of claim 1, wherein the continuously formed anchor is integrally formed from a single rod.

3. The tie-down anchor of claim 2, wherein the rod has a square cross section.

4. The tie-down anchor of claim 3, wherein the rod has a width of ⅛ inch and thickness of ⅛ inch.

5. The tie-down anchor of claim 1, wherein the continuously formed anchor is integrally formed in a mold.

6. The tie-down anchor of claim 1, wherein the length of the vertical section is between 1 to 1.5 inches.

7. The tie-down anchor of claim 1, wherein the loop defines a 360-degree turn with an opening.

8. The tie-down anchor of claim 1, wherein the upper leg is shorter than the lower leg.

9. The tie-down anchor of claim 1, wherein the loop includes an opening which is located above the upper leg.

10. The tie-down anchor of claim 1, further including a metal plate with a hole which cooperates with the lower leg when passed through the hole.

11. The tie-down anchor of claim 10, wherein the metal plate is rectangular and has short edges, long edges, an upper surface, and a lower surface.

12. The tie-down anchor of claim 10, wherein the metal plate has a thickness of ⅛ inch.

13. The tie-down anchor of claim 10, wherein the metal plate includes an upper surface and a lower surface, and the hole extends therethrough;
- the lower leg cooperates with the hole when passed therethrough; and
- wherein the lower leg is passed through the hole and inserted within the gap between adjacent decking boards with the metal plate above the upper surface of adjacent decking boards and the loop is turned to trap the anchor between the decking boards such that the upper leg and the lower leg are perpendicular to the longitudinal axis of the gap and the metal plate can be rotated so as to be perpendicular to the longitudinal axis of the gap to trap the metal plate upon the upper surface of adjacent decking boards.

14. The tie-down anchor of claim 11, wherein the hole runs from the upper surface to the lower surface and is dimensioned to permit the lower leg to pass through the hole, and the metal plate further includes a ring extending from the upper surface of the metal plate and fins extending transversely from the lower surface of the metal plate on opposite sides of the hole.

15. The tie-down anchor of claim 14, wherein the ring runs perpendicular to the long edges of the metal plate and is adjacent the hole, such that when the lower leg of the anchor is inserted through the hole and turned an opening in the loop and an opening in the ring are aligned to permit an arm of a pad lock to pass through the opening in the loop and the opening in the ring.

16. The tie-down anchor of claim 14, wherein the ring is made from a metal.

17. The tie-down anchor of claim 14, wherein the ring extends from the upper surface of the metal plate in a first vertical plane and the fins extend transversely from the lower surface of the metal plate in a single vertical plane perpendicular to the first vertical plane of the ring.

18. The tie-down anchor of claim 17, wherein the hole and fins are located within the single vertical plane.

19. The tie-down anchor of claim 14, wherein the ring extends from the upper surface of the metal plate perpendicular to the long edges of the metal plate and the fins extend parallel to the long edges of the metal plate.

20. The tie-down anchor of claim 10, wherein the metal plate includes an upper surface and a lower surface, and the hole extends therethrough;
- the metal plate further includes a ring extending from the upper surface of the metal plate and fins extending transversely from the lower surface of the metal plate on opposite sides of the hole;
- the lower leg cooperates with the hole when passed therethrough; and
- wherein when the lower leg is passed through the hole and inserted within the gap between adjacent decking boards with the metal plate above the upper surface of adjacent decking boards and the loop turned to trap the anchor between the decking boards such that the upper leg and the lower leg are perpendicular to the longitudinal axis of the gap and the metal plate fixed within the gap by the fins such that the metal plate is trapped upon the upper surface of adjacent decking boards.

* * * * *